S. P. Babcock.
Boot Jack.
N° 98,219. Patented Dec. 28, 1869.
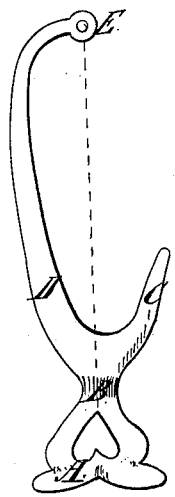
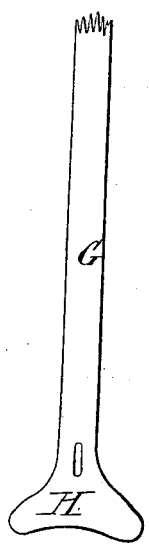
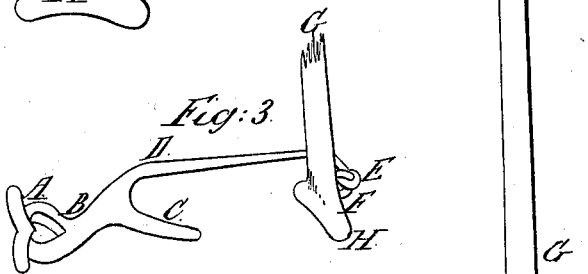
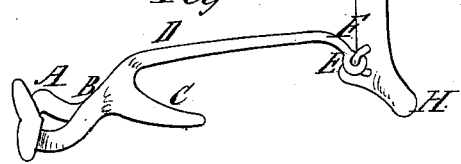
Witnesses
Simeon M. Babcock
John Livesay
Inventor
Sylvester P. Babcock

United States Patent Office.

SYLVESTER P. BABCOCK, OF ADRIAN, MICHIGAN.

Letters Patent No. 98,219, dated December 28, 1869.

IMPROVED BOOT-JACK.

The Schedule referred to in these Letters Patent and making part of the same

*To all whom it may concern:*

Be it known that I, SYLVESTER P. BABCOCK, of the city of Adrian, in the county of Lenawee, and State of Michigan, have invented a new and useful Improvement in Boot-Jacks; and I do hereby declare that the following is a full, clear, and exact description of the construction and operation of the same, reference being had to the annexed drawings, making a part of this specification, in which—

Figure 1 is a perspective view, and

Figure 2, a longitudinal elevation of the boot-jack proper.

Figure 3 shows the toe-piece, reversed or turned to the inside;

Figure 4 shows the form of the toe-piece; and

Figure 5 shows the staple.

To enable others skilled in the art to make and use my invention, I will describe its construction and operation.

I construct the base A, shank B, and one jaw, C, (as shown in fig. 1,) in any compact and suitable form; but in order to obtain a toe-pressure, and the better to use said boot-jack, I extend the jaw D horizontally to a length of nine or ten inches, more or less, then curve it at nearly a right angle, then extend to a point at or near a straight line with the base or body of the jack, as shown in fig. 2.

In the end of the extended jaw D, I make a hole, E, perpendicular to the base.

I make a handle, G, of wood, and nearly three feet long.

On the lower end of the handle, I form a toe-piece, H, as shown in fig. 4.

The handle G, I connect to the boot-jack by means of a screw-eye, or by a staple, F, passing loosely through the perpendicular hole E, and horizontally into the handle, as shown in figs. 1 and 3.

The toe-piece H is readily turned, by means of the handle, to the inside of the extreme end of the jaw D, as shown in fig. 3, making a small-sized boot-jack, or to the outside, as shown in fig. 1, making a large-sized boot-jack.

The boot may be inserted at the side of the jack, and the toe-piece H brought to its proper place, and pressed down on the toe of the boot by means of the handle G.

The base A of the boot-jack I make short, so that it can be as easily used while sitting as standing.

What I claim as my invention, and desire to secure by Letters Patent, is—

The boot-jack, having extended jaw D and loop-hole E, in combination with movable handle H G, provided with toe-piece H and staple F, constructed and arranged as herein described, for the purpose specified.

SYLVESTER P. BABCOCK.

Witnesses:
S. M. BABCOCK,
JOHN LIMSAY.